March 13, 1934.  W. A. SCHULZE ET AL  1,950,697
REDUCING DISCOLORATION OF MOTOR FUELS
Filed June 24, 1930

Inventors
W. A. Schulze
F. E. Frey
By Robt. E. Barry
Attorney

Patented Mar. 13, 1934

1,950,697

UNITED STATES PATENT OFFICE 1,950,697

REDUCING DISCOLORATION OF MOTOR FUELS

Walter A. Schulze and Frederick E. Frey, Bartlesville, Okla., assignors to Phillips Petroleum Company, Bartlesville, Okla.

Application June 24, 1930, Serial No. 463,481

1 Claim. (Cl. 196—144)

This invention relates to a method and apparatus for reducing discoloration of gasoline or like hydrocarbon motor fuels.

It is well known that gasoline and similar hydrocarbon motor fuels, when exposed to light, have a tendency to discolor, and when such a fuel occupies the visible bowl of a filling station fuel pump, the inner surface of the glass cylinder not alone becomes discolored or coated by deposition from the fuel, but the fuel itself has a dirty appearance.

In investigating the prevention of excessive discoloring of gasoline and the like by light rays, we have found that water, if present in sufficient amount and in the liquid phase, in contact with such motor fuel during its exposure to light, will greatly decrease the rate of discoloration as well as its total extent developed by prolonged exposure. Adventitious water, which may occur in gasoline when it is handled in measuring pumps, such as are used by retail distributors, is not present in sufficient amount to prevent discoloration, probably because of its low solubility in gasoline.

We have also discovered that sediment formation which usually accompanies discoloration, and which forms deposits on the walls of the fuel container, is greatly reduced in amount, and is usually virtually absent, when water is present in sufficient quantity as stated, and in liquid phase in contact with the gasoline or the like undergoing exposure to light. This decrease in discoloring, when sufficient water is present, takes place for the several light transmitting container materials tried, namely, soda glass, borosilicate glass and quartz.

The application of water to the gasoline or like hydrocarbon motor fuel may be made in various ways, which must provide in all cases where water alone is used in combination with light rays, for a contact between the liquid fuel exposed to light, and the liquid water. Such contact may be provided by an absorbent or capillary body carrying water, or an aqueous solution, permeable septa, direct contact with a pool of the aqueous liquid, and the like.

When such motor fuels are placed in contact with enough aqueous liquid in the presence of light, even if such gasoline has previously been discolored, the discoloration will tend to disappear and the fuel will become practically water white. Such exposure of either a discolored hydrocarbon motor fuel, or one capable of becoming discolored by light, will produce, we have found, a stability to light. Stability to light then, may be produced by exposing the gasoline or like fuel prior to retail distribution, to light, while in contact with a sufficient amount of water or aqueous solutions. This can be accomplished, for example, by treating the liquid fuel in a storage tank with sunlight, or artificial light preferably high in actinic wave lengths, while in the presence of enough water or aqueous solution to accomplish the desired result.

We have also discovered that small proportions of methanol alone, of the order of 0.05 to 0.5%, added to gasoline or a similar motor fuel, prior to exposure to light, will dissolve and delay and reduce discoloring, and decrease or prevent the formation of a deposit, when the fuel is exposed to light. In such case, there need not be a separate liquid phase containing methanol in contact with the body of gasoline or the like under exposure to light. However, methanol may be used as a carrying agent for water, and permit the beneficial effect of water to be taken advantage of, either with or without a separate aqueous phase, in contact. For these purposes, other simple aliphatic monohydric alcohols may be used with or in place of the methanol, namely, ethyl, propyl, isopropyl, butyl and even amyl alcohols.

This use of alcohols is distinguished from their usual use as ingredients of motor fuels, since proportions below several percent, while they suffice for our purpose, have a negligible influence on the behavior of a motor.

In the accompanying drawing, we have disclosed a few types of apparatus which may be used for our purpose.

Referring to the drawing.

Figure 1:
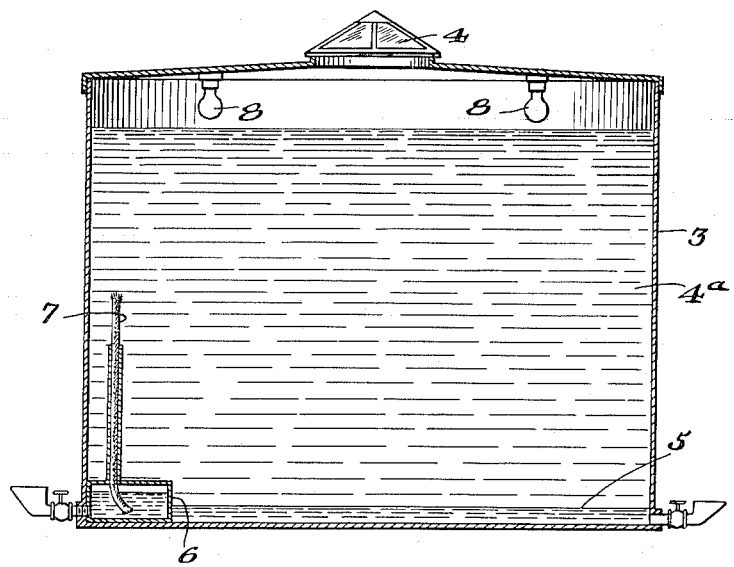
Fig. 1 is a vertical sectional view of a storage tank in which the gasoline or similar motor fuel may be treated prior to transportation or distribution.

The apparatus shown in Fig. 1 consists of a storage tank 3, having opaque walls and an opaque roof, the latter being provided with a transparent or glass skylight 4, through which sunlight or daylight may enter the tank.

The body or pool of gasoline or the like 4a to be treated, may be placed in this tank, and in the bottom portion of the latter, we may arrange a layer or pool 5 of water.

Instead of using a pool of water in the bottom of the tank, we can employ a smaller vessel 6 arranged within the tank and containing a pool of water which saturates a wick 7 that extends from the small vessel 6, into the body of fuel.

In either instance, the water will be in contact with the gasoline or like motor fuel.

Of course, the treatment can be conducted at night, or in a light-tight tank, if suitable lamps 8 are arranged in the tank. Such lamps may be of the quartz mercury vapor type, and can be used to supply actinic light.

Figure 2:
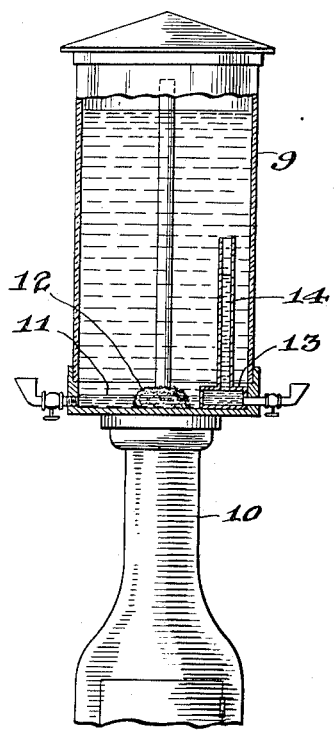
Fig. 2 is an elevation partly in vertical section of a visible type fuel pump shown equipped with means for treating the fuel, pursuant to our invention.

Referring to Fig. 2, it may be seen that the liquid fuel may be treated in the ordinary glass container 9 of a visible type fuel pump 10. In this instance, a shallow pool of water 11 may be arranged in the bottom of the bowl 9, or a sponge 12 saturated with water can be placed in the bowl. Furthermore, the water could be placed in a small container 13 having an upwardly extending unglazed porcelain capillary tube 14 for placing the water in contact with the body of fuel in the bowl 9.

In all of these examples, it will be obvious that the gasoline or like motor fuel will be simultaneously subjected to light rays, and contacted with water in the liquid phase, for the purpose of reducing or preventing discoloration of the motor fuel by light.

The water in any case may be present as an aqueous solution of a substance miscible with water and the fuel, such as methanol, or miscible with water and not with the fuel, as glycol. In the latter case, the condensation of water on the walls of the bowl 9 and freezing of the water are prevented. In the former case, the methanol acts as a carrier for water, and as a discoloration reducer itself.

The simple aliphatic monohydric alcohols hereinbefore mentioned may also be applied alone in a different way to prevent discoloration and sediment formation by light. They are simply added in relatively small percent to the fuel following the ordinary refinery treating operations. Such percentage may be less than one percent of the fuel treated, and is never more than a few percent.

It will be noted in accordance with our invention, that the gasoline or like motor fuel may be treated while at ordinary atmospheric temperatures.

The process may be applied to motor fuels which have received such previous treatment as would bring sulphur content and gum formation below the permissible maximum, and after treatment in accordance with our invention, the fuel may be marketed without further treatment. The gasoline or like fuel so produced may be faintly colored, but is not seriously discolored by further exposure to light.

The maximum amount of adventitious water that can be held in true solution in gasoline is of the order of 0.001%, and as hereinbefore stated, is not enough to prevent discoloration of the fuel. We have discovered that for prevention of discoloration, the water should be present in an amount approximately the chemical equivalent of the quantity of discoloring matter present in the gasoline or the like. The minimum amount of such water is about 0.01% of the fuel treated.

While we are not absolutely certain as to the theory upon which our invention is based, we believe that discoloration is brought about by sulphur compounds and diolefines in the gasoline, and when such a motor fuel is exposed to light while the fuel is in contact with a sufficient amount of water, the latter enters a reaction and certain chemical changes occur which makes the water acid. Consequently, the water should be renewed periodically, say once a month.

When ordinary gasoline is exposed to sunlight without the presence of water, in about a period of two hours, the discoloration is apparent and the gasoline takes on a darkened appearance. In accordance with our invention, if the exposure to light takes place while the gasoline is in contact with a sufficient amount of water or the alcohols above mentioned, such discoloration will not occur, no matter how long the gasoline is exposed to light rays. On the other hand, where the gasoline is treated in bulk to permanently prevent the same from being affected by light rays, we propose to maintain the contact with the water or alcohol, or mixtures thereof, for a period of about twenty-four hours.

From the foregoing it is believed that the invention may be readily understood by those skilled in the art, and we are aware that changes may be made in the details disclosed, without departing from the spirit of the invention, as expressed in the claim.

What we claim and desire to secure by Letters Patent is:

A method of substantially preventing discoloration of hydrocarbon liquid motor fuels when exposed to light, comprising contacting such a fuel while exposed to actinic light rays with an aqueous solution of glycol and water as a separate liquid phase, the amount of water present being equal to at least about 0.01% of the fuel being treated.

WALTER A. SCHULZE.
FREDERICK E. FREY.